US009992647B2

(12) United States Patent
Roy et al.

(10) Patent No.: US 9,992,647 B2
(45) Date of Patent: Jun. 5, 2018

(54) TAG BASED FILTERING ON GEOGRAPHIC REGIONS, DIGITAL ASSETS, MESSAGES, AND ANONYMOUS USER PROFILES

(71) Applicant: Ping4 Inc., Nashua, NH (US)

(72) Inventors: Sean Roy, Stratham, NH (US); Kurt Dobbins, New Castle, NH (US); Mark Sexton, Merrimack, NH (US); Sett Paing Oo, Nashua, NH (US); Rindress MacDonald, Hollis, NH (US); Tatsuki Nakano, Nashua, NH (US); Daniel Post, Tewksbury, MA (US)

(73) Assignee: PING4, INC., Nashua, NH (US)

( * ) Notice: Subject to any disclaimer, the term of this patent is extended or adjusted under 35 U.S.C. 154(b) by 0 days. days.

(21) Appl. No.: 15/652,163

(22) Filed: Jul. 17, 2017

(65) Prior Publication Data

US 2017/0318442 A1 Nov. 2, 2017

Related U.S. Application Data

(62) Division of application No. 15/170,694, filed on Jun. 1, 2016, now Pat. No. 9,756,490.

(60) Provisional application No. 62/171,900, filed on Jun. 5, 2015.

(51) Int. Cl.
| H04L 29/06 | (2006.01) |
| H04W 4/18 | (2009.01) |
| H04W 4/02 | (2018.01) |
| H04L 29/08 | (2006.01) |
| H04W 4/12 | (2009.01) |
| G06Q 30/02 | (2012.01) |
| H04W 88/02 | (2009.01) |

(52) U.S. Cl.
CPC ........ *H04W 4/185* (2013.01); *G06Q 30/0267* (2013.01); *H04L 67/303* (2013.01); *H04W 4/02* (2013.01); *H04W 4/026* (2013.01); *H04W 4/12* (2013.01); *H04W 4/60* (2018.02); *H04W 88/02* (2013.01)

(58) Field of Classification Search
CPC .... G01C 21/3673; H04W 4/003; H04W 4/12; H04W 4/02
USPC ........ 455/404.1, 404.2, 456.1–457; 340/539.13, 988–996; D10/104.2
See application file for complete search history.

(56) References Cited

U.S. PATENT DOCUMENTS

| 6,684,370 B1 | 1/2004 | Sikorsky | |
| 2014/0236678 A1* | 8/2014 | Akerman | G06Q 30/0205 705/7.34 |
| 2016/0198449 A1* | 7/2016 | Nagata | H04W 8/005 370/329 |

* cited by examiner

*Primary Examiner* — Ronald Eisner
(74) *Attorney, Agent, or Firm* — Arent Fox LLP

(57) ABSTRACT

A method, apparatus, and computer program product for performing region monitoring using tag matching to more closely match the monitored regions to a user's preference. A user enters user tags of interest, which are persisted to the region monitoring web server. The web server returns the closest regions having a region tag matching user tag first and the closest regions without matching tags secondary. An application at the mobile device then performs region monitoring of the identified closest region(s). When the mobile device enters a monitored region, it reports this event to the web server. The web server then determines whether any messages and/or assets associated with the region have matching message tags or asset tags and returns such messages or assets to the mobile device.

19 Claims, 10 Drawing Sheets

TAG BASED FILTERING ON GEOGRAPHIC REGIONS, DIGITAL ASSETS, MESSAGES, AND ANONYMOUS USER PROFILES

CROSS-REFERENCE TO RELATED APPLICATIONS

This application is a divisional of, and claims priority to, U.S. patent application Ser. No. 15/170,694, entitled "TAG BASED FILTERING ON GEOGRAPHIC REGIONS, DIGITAL ASSETS, MESSAGES, AND ANONYMOUS USER PROFILES" and filed Jun. 1, 2016, which claims priority to, and the benefit of, U.S. Provisional Application Ser. No. 62/171,900, entitled "TAG BASED FILTERING ON GEOGRAPHIC REGIONS, DIGITAL ASSETS, MESSAGES, AND ANONYMOUS USER PROFILES" and filed on Jun. 5, 2015, which are both expressly incorporated by reference herein in their entirety.

BACKGROUND

Field

Aspects of the present disclosure relate generally to region monitoring at a mobile device including matching interests of a user with related defined regions, including digital assets and messages pertaining to those defined regions.

Description of the Related Art

The cell phone market is transitioning from 'feature' phones to 'smart' mobile devices. Feature phones primarily allow phone calls and text messages. Smart mobile devices (phones, tables, etc.) allow the functionality of a laptop computer in a smaller mobile device. Smart mobile devices can connect to the Internet either over the cell phone network or by using Wi-Fi connectivity. Smart mobile devices can run small software applications known as apps. Smart mobile devices can be aware of the device location through the use of a Global Positioning System (GPS) chip, cell phone tower triangulation, or a Wi-Fi network location mapping.

Certain applications track the location of the smart mobile device through the use of some or all of the methodologies available to the device. Navigation software applications are an example of one class of applications that track the location of the mobile device with high precision in order to be able to provide detailed turn-by-turn navigation instructions. However, navigation applications also consume a corresponding large amount of the available battery power.

Smart mobile devices can receive emails, containing rich media information, but the email is not specific to the location where the mobile device is located.

As part of the Location Services provided by the mobile operating system on the smart mobile device, the devices are able to identify and track the position of the device relative to predefined regions. This process is known as Region Monitoring. An example region may be a geographic area defined by a circular area of a specified radius defined around a geographic point (e.g., latitude, longitude), such as a point of interest to the user. The region may be small (on the order of 150 meters) or large (on the order of tens of miles, or larger). The Location Service on the mobile device may be programmed with Regions to monitor. The Location Service on the mobile device has a recommended minimum size for region to be monitored (on the order of 150 meters). Only regions with this radius or larger can be accurately monitored by the Location Service. After establishing regions to monitor, the mobile operating system (OS) will notify a corresponding location based mobile application on the mobile device when the mobile device has entered or exited a region that the application has designated for the mobile OS to monitor.

As with all uses of the mobile OS Location Services, region monitoring can result in significant battery usage. Current region monitoring also lacks efficiency in providing users with information corresponding to their interests. Current region monitoring is in the context of the mobile device; where the Location Service on the mobile device alerts upon entry and exit of monitored regions on that particular device.

SUMMARY

In an aspect of the disclosure, a method, system, mobile device, mobile device application, web service, and computer program product are presented that are capable of performing user customized region monitoring. A user enters user tags for their current interests. The user tags are persisted to the region monitoring web server. The web server may return one or more of the closest regions having a region tag matching a user tag. If no region tags match the user's tags, the closest regions are returned. An application at the mobile device then performs region monitoring of the identified closest region(s). When the mobile device enters a monitored region, the mobile device reports this event to the web server. The web server then determines whether any messages and/or assets associated with the region have matching tags. When matches are found, the web server transmits such messages or assets to the mobile device. The web server may also send messages to other interested parties, update information databases, or update information displays identifying the mobile devices with matching tags.

Aspects of the system outlined herein enable a web server to be used to monitor regions for anonymous mobile devices. As an anonymous mobile device enters or exits a region, the mobile device may send a message to the web server. In doing so, the web server is able to aggregate information and statistics from one or more anonymous mobile devices regarding the region being monitored. The web server may be configured to notify the region owner to thresholds concerning the number of anonymous devices nearby or within a region. For example, perhaps the owner of a region wishes to run a promotion for the $100^{th}$ visitor to his retail store that day. The web server, tracking region enter events for the retail store, can do this. Perhaps a retail storeowner does not want to run a promotion unless there are 500 mobile devices nearby. The web server, tracking devices that are monitoring that region, can also do this. The mobile devices are aware of the regions entered and exited by the mobile device. This in turn makes the web server aware of the anonymous mobile devices that enter and exit a region, as well as the anonymous mobile devices that are nearby all of the regions. This data can be used to allow the regions to perform nearby monitoring of anonymous mobile devices.

An aspect of particular interest to many industries may include the ability to send a message to a mobile device user who is nearby or within a region. Among others, this message may include any of a marketing message, a coupon message, a time sensitive message, or a safety message. The message can be associated to a region. Thus, the message may be most effective and most interesting to people who are nearby or within the region associated with the message.

Aspects may further include providing region monitoring in a manner in which the identity of the owner of the smart phone is never known to the system. A username or explicit registration may not be required. The user may never be required to enter an email address or phone number. The system may function, e.g., without collecting the phone Unique Device Identifier (UDID). The smart mobile device may operate to enable location services on the device.

For example, customers who wish to deliver location-based messages to mobile device users may log in to a web service to define geographic regions and may then associate messages with those regions. Among other content, messages may also include digital assets such as photographs, videos, sound files, documents, etc.

A tag may be a string, a key-value pair where both members of the pair are string values, or a string n-tuple (a unique combination of N strings). The content of the tag may be arbitrary. The meaning of the tag may be arbitrary. A tag may be used merely as a means of pattern matching.

In an aspect, the mobile application may offer the application user the ability to associate tags to the anonymous mobile device record stored in a database on the web server. The mobile application offers the app user the ability to associate tags to the digital assets loaded to the web server from the mobile device or other content sources.

Customers can associate tags with regions created on the web server customer portal. Customers can associate tags with messages created on the web server customer portal. Customers can associate tags with digital assets loaded through the web server customer portal.

When the mobile application retrieves new regions nearby, the tags may be used to match application user interests to regions of similar interests. Likewise, messages to be displayed with a region can be triggered by and only displayed to users with matching tags. Digital assets can be displayed to the user based on matching tags. Messages and tags can inherit their tags from the region they are associated with, as well as have their own tags.

Tags may be predefined and configured; tags may default to certain values; or there may not be any tags defined or configured (which may imply matching all). The value of the tag on a region, message, or asset may be configured on the web server via a web portal to change based on the time of day.

The web server and the mobile application might never assign meaning to the tags. The software on the mobile application and the web server do not behave differently according to the value of a tag. The tags may be opaque values that serve as items upon which to perform pattern matching.

Additional advantages and novel features of aspects of the present invention will be set forth in part in the description that follows, and in part will become more apparent to those skilled in the art upon examination of the following or upon learning by practice thereof.

DETAILED DESCRIPTION

Figure 1:
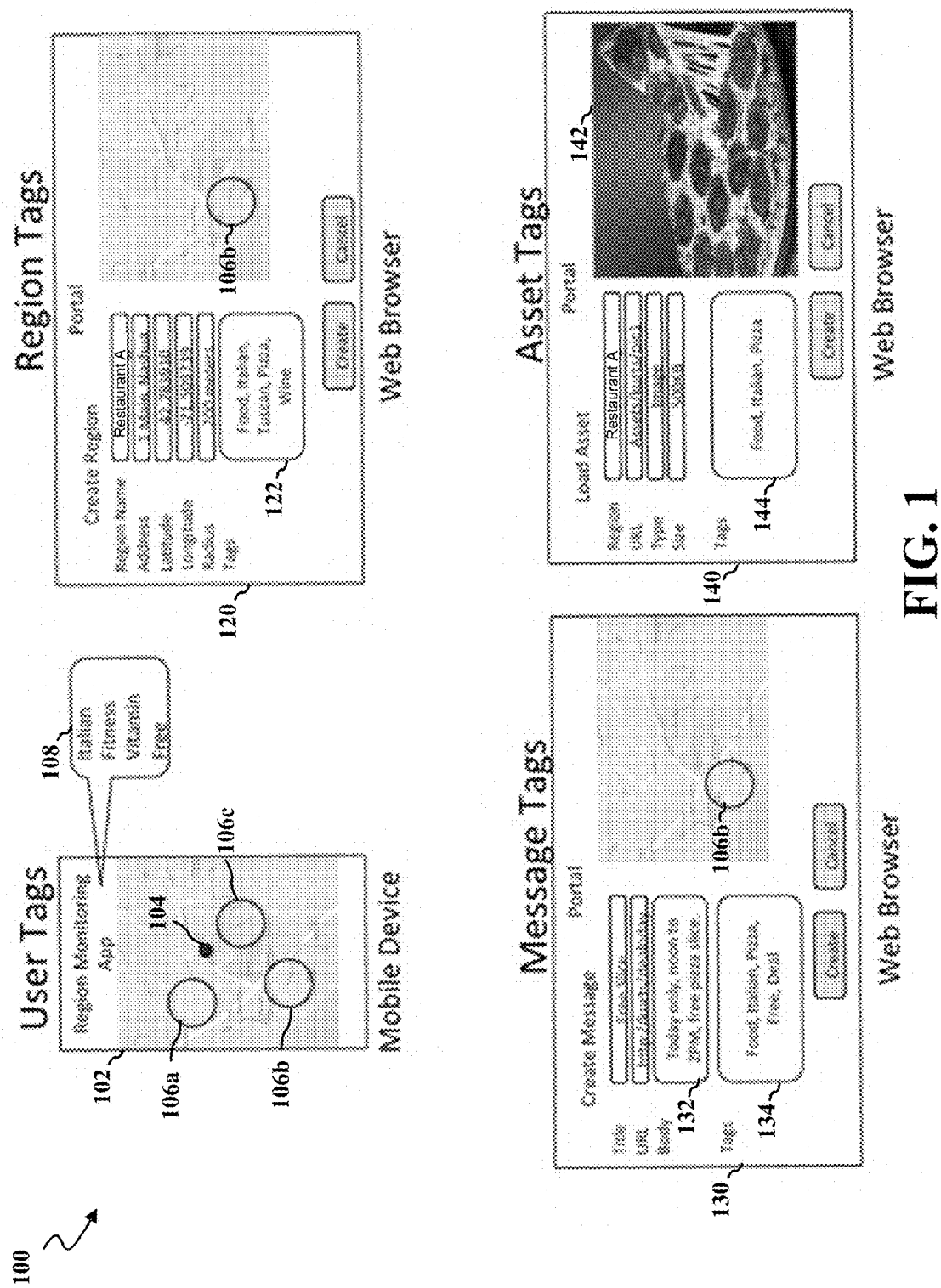
FIG. 1 illustrates aspects of associating tags to users, regions, messages, and assets, in accordance with aspects of the present disclosure.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details and that the invention is not limited in its application to the details of construction and the arrangements of components set forth in the following description or illustrated in the drawings. Moreover, the claims hereof are not to be read restrictively unless there is clear and convincing evidence manifesting a certain exclusion, restriction, or disclaimer.

Several aspects of optimizing mobile device region monitoring and region management including customized identification of the regions to be monitored will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Aspects presented herein relate to U.S. application Ser. No. 14/616,400 titled "METHOD FOR OPTIMIZING MOBILE DEVICE BATTERY USE WHILE TRACKING THE LOCATION OF AN ANONYMOUS MOBILE DEVICE" and filed on Feb. 6, 2015, and U.S. Provisional Application No. 62/137,046, titled "METHOD FOR OPTIMIZING MOBILE DEVICE REGION MONITORING AND REGION MANAGEMENT FOR AN ANONYMOUS MOBILE DEVICE" filed on Mar. 23, 2015, the entire contents of each of which are incorporated herein by reference.

FIG. 1 shows a conceptual depiction of relating tags to different parts of the system—the user preferences, the region description, the message description, and the digital assets, in accordance with aspects presented herein.

Figure 2:
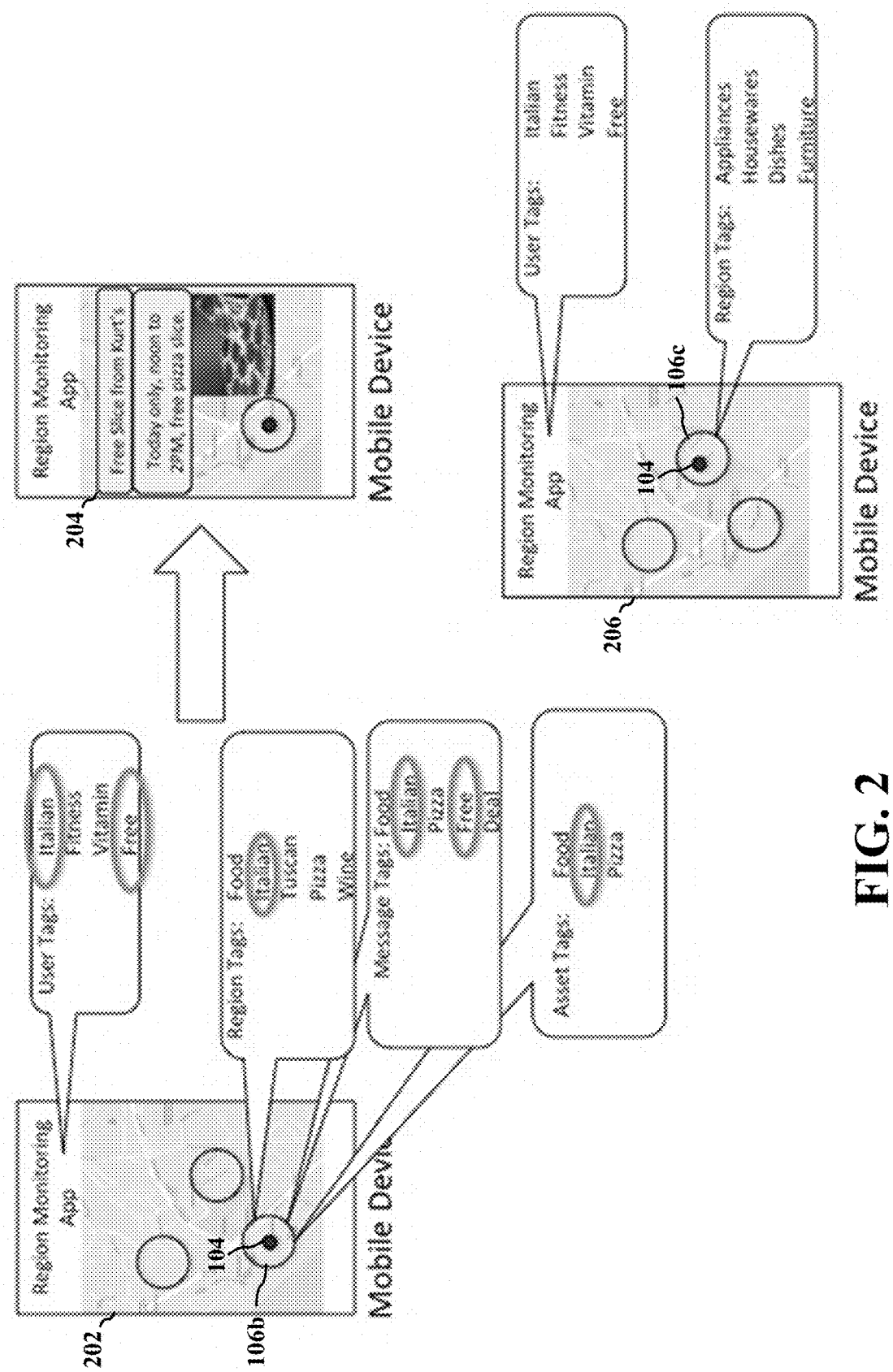
FIG. 2 illustrates aspects of matching user tags to regions, messages, and assets, in accordance with aspects of the present disclosure.

FIG. 2 shows those tags can be used to match the values of the user preferences to the region descriptive tags, the message descriptive tags, and the asset descriptive tags to deliver targeted content that the mobile app user would welcome, in accordance with aspects presented herein.

Figure 3:
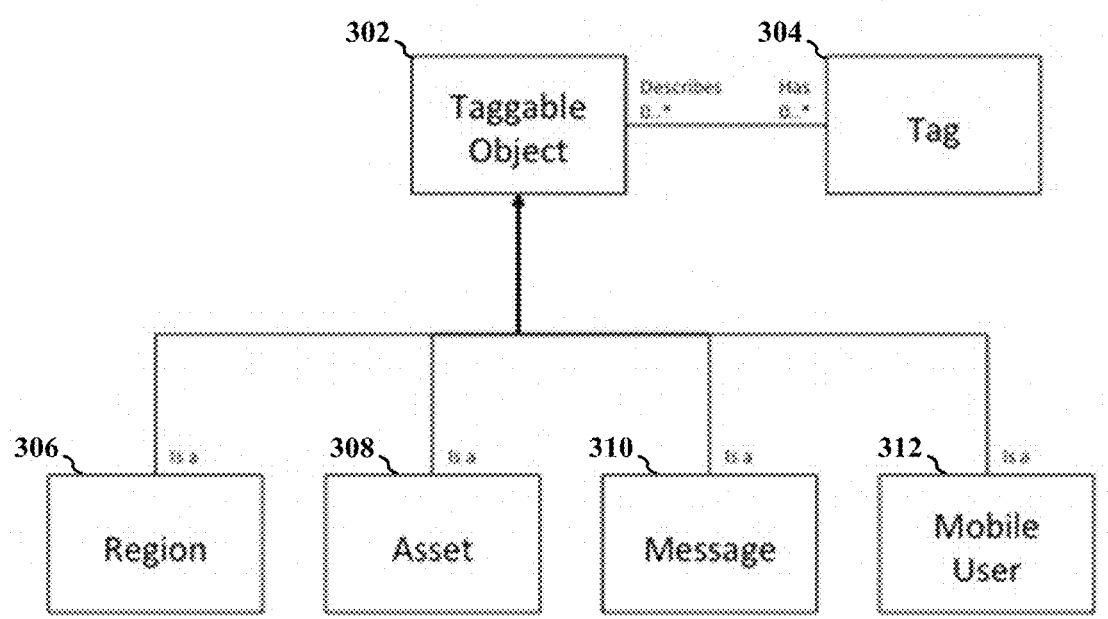
FIG. 3 is an example UML object diagram depicting the relationship between tags and other objects, in accordance with aspects of the present disclosure.

FIG. 3 is a simple Unified Modeling Language (UML) diagram of the relationship between tags and the various objects of the system, in accordance with aspects presented herein.

Figure 4:
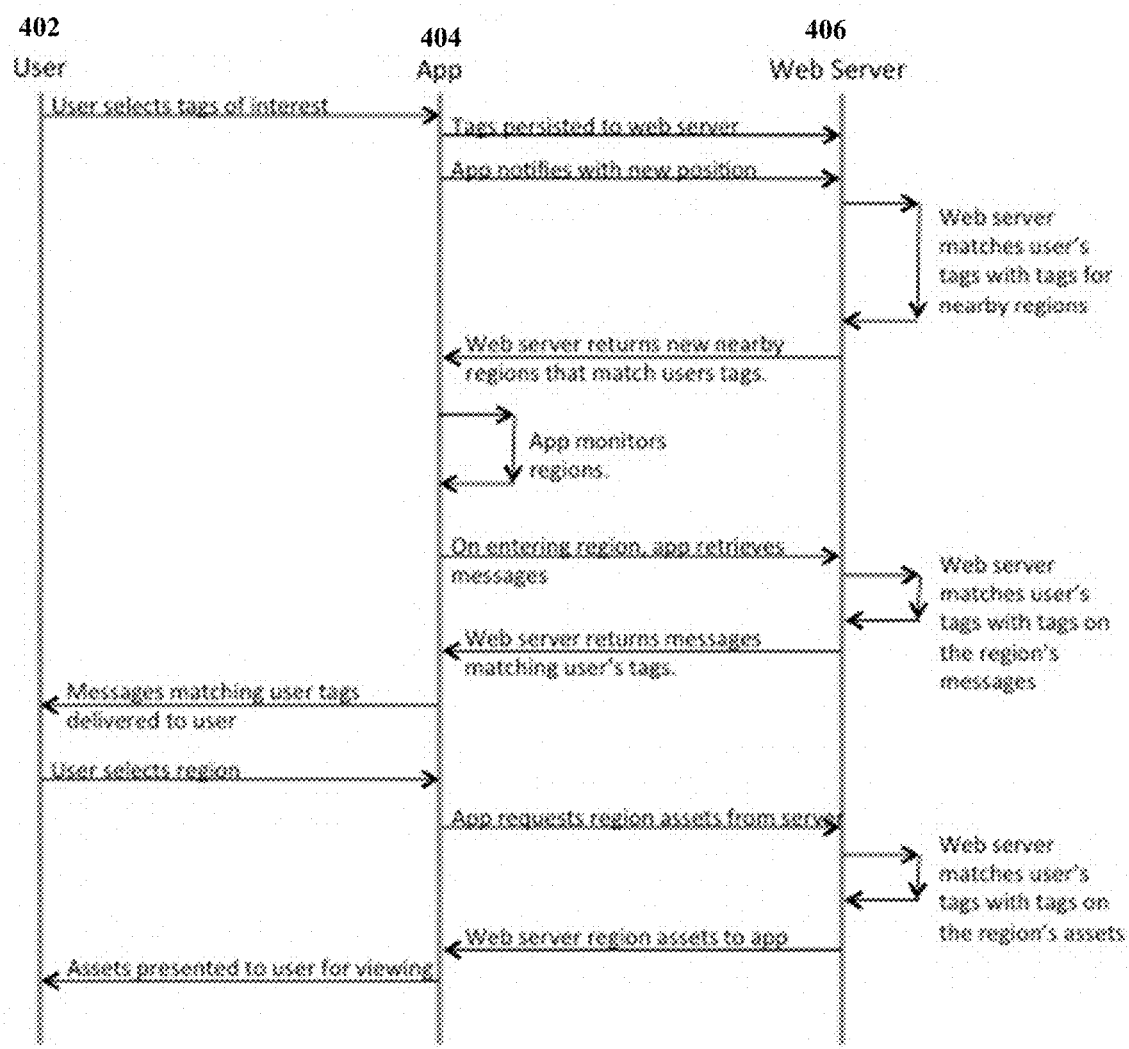
FIG. 4 illustrates an example method of pattern matching that may be used by a system to filter objects with matching tags, in accordance with aspects of the present disclosure.

FIG. 4 is a sequence diagram depicting the processing involved with matching user tags to the tags describing a defined region, monitoring the regions of interest, and receiving messages and assets of interest from the regions of interest, in accordance with aspects presented herein.

Mobile applications (apps) may be capable of using the mobile operating system Location Service to monitor the entry into or exit from a geographic area called a defined region. U.S. Provisional Application No. 62/137,046 describes a method for managing the regions that are being monitored by the mobile device and which can be further refined through the use of pattern matching tags using aspects presented herein.

For example, a user of a smart mobile device may download and install an application onto the device. The application may register the smart mobile device with the web service. The mobile application may then begin to dynamically and adaptively monitor regions nearby the mobile device. For example, the nearby regions may be updated as the mobile device moves, as described in Application No. 62/137,046.

As the number of regions that can be tracked by a mobile device Location Service may be limited in order to enhance battery life, there is a need to track regions of interest to a mobile device user in a more efficient manner in order to minimize the use of precious resources while providing a more enjoyable user experience. A mobile device user may better tolerate being notified of nearby businesses and deals when the user has opted in to those notifications and the notifications are directly related to the user's configured preferences. As described herein, the user may at any time add new preferences, or set temporary preferences for the purpose of venue-specific, temporal, or location-based interests.

The aspects presented herein may include not only managing the closest monitored regions to the mobile device user, but also managing the regions of specific user interest that are closest to the mobile device user.

A region may have a radius of 150 meters or more, allowing the region to be monitored by the mobile operating system for entry and exit. The region may also have a radius less that 150 meters, even down to 0 meters. These regions may not be monitored by the mobile OS Region Monitoring, but may still have all of the other properties of a monitored region, including tags.

The mobile application may offer the application user the ability to associate tags to the anonymous mobile device record stored in a database on the web server. The mobile application may also offer the application user the ability to associate tags to the digital assets loaded to the web server from the mobile device.

Customers may also be enabled to associate tags with any of regions created on the web server customer portal, messages created on the web server customer portal, and digital assets loaded through the web server customer portal.

When the mobile application retrieves new regions nearby, the tags may be used to match the application user's interests to regions of similar interest, regardless of the radius of the region. Likewise, messages can be triggered for display with a region by the user having a matching tag so that it is only displayed to users with matching tags. Among others, messages associated with a region might include advertisements, suggested activities, location specific safety warnings, business information such as restaurant menus, work order information, information about other application users near you, or public or private messages left by other application users.

Similarly, digital assets can be displayed to the user based on matching tags. Messages and tags can inherit their tags from the region with which they are associated, as well as having their own tags.

For example, the user may be offered the ability to set preferences in the mobile application. These preferences may be keywords, key-value pairs, or n-tuples. An example keyword may be a word like "Italian". An example key-value pair may be "restaurant", "Italian". An example tuple may be "restaurant", "Italian", "pizza".

Once the user of the mobile device configures these preferences, the system may then persist these preferences within a web-server database. When the mobile device requests a new set of regions to be monitored, these preferences may be matched to the preferences of the surrounding regions. Regions with matching preferences may be returned to the user first, e.g., at a higher priority. For example, if there are 5 regions with a key-value pair of "restaurant" "Italian" close to the mobile device with a configured preference for "restaurant" "Italian", then those 5 regions may be returned to the mobile device to be monitored. If there are 3 regions with a key-value pair of "restaurant" "Italian" close to the mobile device with a configured preference for "restaurant" "Italian", then those 3 regions, along with the two next closest regions, may be returned to the mobile device to be monitored.

Tag matching may be explicit, partial, or even hierarchical.

Tag matching may include applying a rule set; for example, AND, OR, NOT.

Tag matching may be temporal and include a time component as a rule.

Tags may associate private and public key portions for restricted or reserved use.

Tags for regions may be dynamically discovered by the mobile device, and optionally presented to the user for selection.

For example, FIG. 1 illustrates example screen shots from a user interface in an example region monitoring application according to aspects presented herein. In the view at 102, the mobile device user is displayed a map showing a current location 104 of the mobile device and defined regions 106a, 106b, and 106c. In this example, the user has entered keyword tags using the application at the mobile device of "Italian", "Fitness", "Vitamin", and "Free."

Application users, e.g., venue operators, may enter keyword tags to be associated with their region at the application's web service. At 120, a user interface is illustrated that shows that a region can be created, e.g., for a restaurant called "Restaurant A," using a web browser portal. The creation of the region may include entry of any of an address, latitude and longitude, and a defined region surrounding the region such as a radius. In addition to this information, keyword tags may be associated with the region. As illustrated at 122, the region for Restaurant A has keyword tags of "Food", "Italian", "Tuscan", "Pizza", and "Wine" associated with it.

In addition to keyword tags for the region, keyword tags may be associated with a message relating to the region. At 130, a "Free Slice" Message has keyword tags 134 of "Food", "Italian", "Pizza", "Free", and "Deal" associated with it. The message may be created at the web browser portal for the application and may allow the venue user to enter the body of the message 132 and keyword tags to be associated with the message.

Similarly, a region asset may have keyword tags associated with it. At 140, the asset is an image 142 and has keyword tags 144 of "Food", "Italian", and "Pizza" associated with it.

FIG. 2 illustrates example aspects of a process of pattern matching the tags between those that a user has entered in the region monitoring application and those associated with regions nearby the mobile device's location. At 202, the mobile device 104 is located within the region 106b defined for Restaurant A. When the user uses the application on the mobile device and regions are requested by the application, the "Italian" tag entered at the application by the user is compared to the "Italian" tag associated with "Restaurant A" region at the web service. As there is a match between the tag entered by the user and that associated with the defined region for Restaurant A, the region 106b is then returned to the mobile application by the web service and the region is monitored on the mobile application.

As well, when the mobile device enters the defined region for "Restaurant A," the mobile application may perform keyword matching in order to retrieve messages for the region from the web server. The user keyword tag's "Italian" and "Free" match the "Free Slice" message so that web server returns the free slice message to the user based on the web server matching the keyword tags, as illustrated at 204.

Similarly, when the application retrieves the assets for the message from the web server, the web server may match the user "Italian" keyword to the "Italian" keyword on the photo asset and returns that asset to the mobile app. The web server may ignore nearby regions, messages, and assets with a "Polish" tag in this process because the "Polish" tag does not match any of the User tags.

Similarly, in 206, the mobile device has entered a new region, 106. However, the tags associated with this new region include "Appliances," "Housewares," "Dishes," and "Furniture." As these tags do not match any of the tags entered by the user into the application, no messages might be returned from the web server to the application.

The web server and the mobile application might never assign meaning to the tags. The software on the mobile application and the web server might not behave differently according to the value of a tag. The tags may be opaque values that serve as items upon which to perform pattern matching.

Thus, the web server might not attach meaning to any of the user preferences. The preferences may be treated strictly as pattern matching strings. If the pattern of the region matches the pattern of the user, the region/message/asset may be returned from the web server to the mobile device application.

One exception to this pattern matching opacity may be for certain, predefined keywords that the system will use to affect the behavior of the application client or the server or both.

For example, the web server may define reserved tags. These tags may be used to convey certain useful and well-known concepts for a variety of different uses.

One such reserved or predefined tag may be the tag "Color". This tag may be used to convey the color that a region should be displayed in on the user interface of a mobile application. Other predefined tags may be "Region-Type", "RegionShape", "MessageType", or "AssetType".

For example, a key-value pair of "color"-"red" for a region may cause the depiction of the region in the mobile app to be colored red. It may also cause the depiction of the region in the web server portal to be colored red. If the key-value pair is "color"-"green", then the region may be colored green in the mobile app and the web server portal.

The value of a reserved tag, or any tag, may be encrypted for security reasons.

A rich set of data collection and analytics may be enabled by combining user tags, location, regions, assets along with matches and non-matches of the tag pattern filters. In addition date and time may also be included in the data collection. This data can be collected singularly or aggregated by any of the data points or combinations of the data points.

The web server may generate reports and business intelligence based on anonymous mobile devices, regions, region enter times, region exit times, and duration spent within regions. The web server may also generate reports and business intelligence that include tag information.

Such reports may be used to generate reports addressing the following questions:

1. Which of my region tags most often matches a mobile device tag?

2. Which of my message tags most often match a mobile device tag?
3. What mobile device tags are most popular within my region?

Thus, for a given venue having a defined region stored at the web service, an analysis may be made of any of the activity distribution and frequency of matches among a plurality of tags associated with the venue, the frequency of matches among message tags, and the frequency of matches among tags associated with all of the defined regions within a certain distance from the given venue.

As described above, this may all be done in an anonymous manner, e.g., as described in U.S. Provisional Application No. 62/137,046, titled "METHOD FOR OPTIMIZING MOBILE DEVICE REGION MONITORING AND REGION MANAGEMENT FOR AN ANONYMOUS MOBILE DEVICE" and filed on Mar. 23, 2015, the entire contents of which are incorporated herein by reference. For example, location information and tag information may be transmitted between the mobile device application and the web server using an anonymous token to identify the mobile device.

In order to allow many different types of objects in the system to each have tags associated with them, a simple object model of inheritance may be used. FIG. 3 depicts a UML diagram of such an object model, showing how objects inherit from the Taggable Object object. All Taggable objects may be associated with a Tag. For example, FIG. 3 illustrates that each Taggable Object 302 may have 0 to many descriptive Tags 304. FIG. 3 also illustrates that a region 306, asset 308, message 310, and mobile user 312 are each taggable objects that may be associated with a plurality of tags. Since region 306, asset 308, message 310, and mobile user 312 are each taggable objects, in object oriented software development, these objects inherit all of the capabilities and attributes of a Taggable Object 302. Thus region 306, asset 308, message 310, and mobile user 312 do not need to implement their own relationships to Tag 304 in the software code. The relationship to Tag 304 only needs to be implemented once, in the software code for Taggable Object 302.

FIG. 4 illustrates a sequence diagram of a method of monitoring regions including matching information to user preferences. FIG. 4 illustrates the actions that are taken by a user 402, by an application 404 at the user's mobile device, and at a web server 406 associated with the application.

First, the user 402 selects and configures tags of interest that are saved to the web server. The user may enter these tags into their mobile device using the application 404. The application 404 then forwards the tags to the web server 406. In an aspect, the mobile device application may discover the tags for regions that are nearby.

As the mobile device moves, the application notifies the web server 406 when a new set of nearby regions needs to be retrieved from the web server 406 for monitoring by the mobile application 404. As noted above, the tags and the location updates may be provided to the web server in an anonymous manner that does not provide person information about the user of the mobile device.

At the web server, a comparison is made using the mobile device's location and the user entered tags in order to find matches for tags associated with nearby regions. The web server then returns new nearby regions having matches with the user's tag(s).

Thus, when the application retrieves new nearby regions from the web server, the user tags may be matched to region tags to return regions of the most interest to the mobile application.

Once the application has received the new nearby regions from the web server, the mobile application monitors these nearby regions. When the mobile device enters one of the regions, the application requests the messages for the region from the web server.

In an aspect, the web server may match the user tags to the message tags and return the message(s) that most closely matches the user's entered tags to the mobile application. The mobile application then displays those messages at the mobile device to the user.

When the user selects a particular region, the application may request the region's assets from the web server. In an aspect, the web server may match the user's tags with the tags associated with at least one asset. Then, the web server may return the asset(s) most closely matching the user's interests to the mobile application by returning the assets(s) that most closely match the user's entered tags. The mobile application then displays those assets to the user, e.g., on a display of the mobile device.

Figure 5:
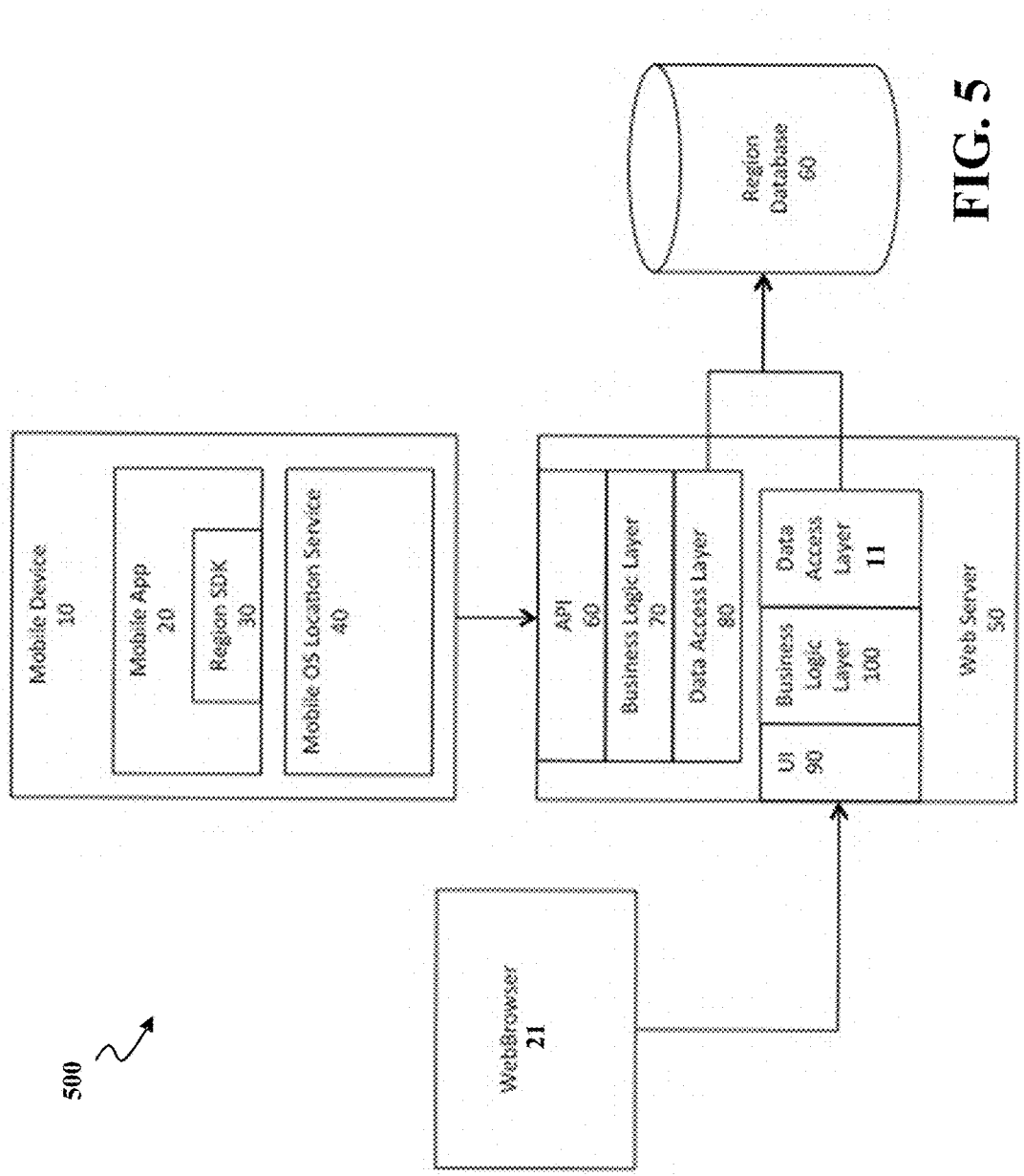
FIG. 5 illustrates an example system diagram of various hardware components and other features, for use in accordance with aspects of the present disclosure.

FIG. 5 is a diagram illustrating an example system 500 for optimizing region monitoring at a mobile device, as described herein. The system includes a mobile device 10. Examples of mobile devices 10 include a cellular phone, a smart phone, a laptop, a personal digital assistant (PDA), a fitness band, a tablet, a multimedia device, a GPS system, a camera, an MP3 player, a mobile game console, or any other similar functioning mobile device that includes a location service capable of monitoring regions and discovering the location of the device.

Mobile device 10 includes a mobile application 20 downloaded on the mobile device, the application 20 having an SDK or client-side Application Program Interface (API) code embedded therein in order to enable the adaptive region monitoring aspects described herein. The application may be a mobile device application that relies on the mobile device location service to monitor the identified regions of interest in relation to the location of the mobile device. The location service may be a component of the OS of the mobile device. The location service may monitor the location of the mobile device using, e.g., any of GPS, Wi-Fi, and cellular tower triangulation.

Mobile device 10 includes a location service 40 that determines a location of the device and is capable of monitoring regions. The location may be determined using any of GPS, cellular tower triangulation, and Wi-Fi network location mapping. On a smart phone, for example, the location service 40 may be a component within the mobile OS. The location service 40 may report the determined location to other applications functioning on the mobile device 10, such as application 20. Such applications may include a location tracking application, or an application having a region of interest for which the application monitors the mobile device's presence relative to the region. For example, an OS may report a location of the device in latitude and longitude to the application 20 along with an estimated accuracy for the determined location. Additionally, the location service 40 may provide an indication about which source was used to determine the location. For example, the location may be provided with an indication that GPS information was used to obtain the location of the device.

The mobile device mobile device communication with a remote web server 50 in order to receive information about the regions that should be monitored and a region defined by an adjustable radius that should be monitored around the mobile device. Such communication may be generated at times by the application 20 or Software Development Kit (SDK) 30. In one example, an SDK may be used at the mobile device, e.g., embedded within one or more mobile applications, that enables applications on the mobile device to embed the technology to enable the mobile device to efficiently monitor regions. The SDK does this by being incorporated during development and compilation into the mobile application.

The web server may be a remote server that provides information for periodically adjusting the regions monitored by the mobile device and for providing messages, assets or other services corresponding to events relating to the monitored regions. The web server may customize the selection of regions, messages, and assets by matching user tags to region tags, message tags, and/or assets tags for nearby regions.

The web server includes, e.g., an Application Program Interface (API) 60, business logic layer 70, data access layer 80 configured to receive and process the communication from the mobile device and process. Web server also includes business logic layer 100 and data access layer 11 that provide the capability to retrieve regions and messages for the mobile applications, e.g., by matching user tags and any of region tags, message tags, and asset tags for nearby regions.

The web server includes a user interface (UI) that can be accessed, e.g., via a web browser 21. The user interface allows information to be entered into the web browser, such as the entry and management of regions, associated messages and assets as well as tags for the region, messages, and/or assets. Web server may also include or be operatively coupled to a region database 60 that stores the identified regions. The regions may be identified, e.g., by a region ID. Each region may be stored in connection with their physical location, e.g., in latitude and longitude. Messages may be stored in connection with each region, the messages identified as corresponding to enter events, exit events, or other events, and each message may have its own message tag(s).

Figure 6:
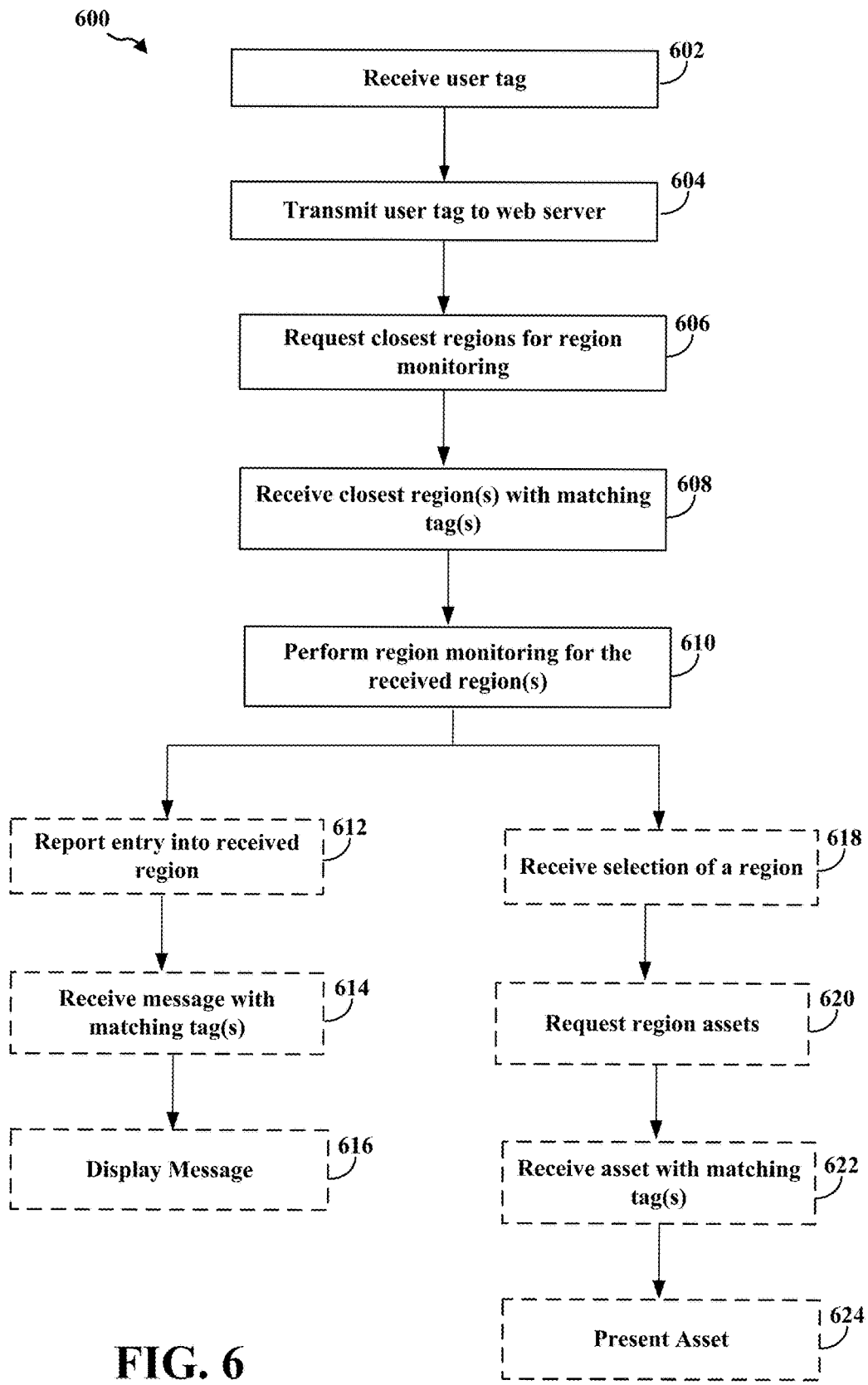
FIG. 6 illustrates a flow chart of an example method, in accordance with aspects of the present disclosure.

FIG. 6 illustrates an example method 600 of performing region monitoring at a mobile device. The method may be performed by an application operating on a mobile device such as mobile device 10 in FIG. 5 or 700 in FIG. 7.

At 602, the mobile application receives entry of a user tag for region monitoring. The user may enter one user tag or multiple user tags for preferences at the mobile device.

At 604, the mobile application transmits the user tag to a web server. This may be done in an anonymous manner.

At 606, the mobile application requests, from the web server, a number of closest regions to be monitored relative to a current location of the mobile device. Each region may be centered at a specific location and including an area within surrounding radius from the center location, e.g., as illustrated in FIG. 1.

At 608, the mobile application receives the closest regions from the web server. Priority is given to the closest region(s) having an associated region tag matching the user tag. If there are no tag matches, the closest regions are returned. If multiple regions near the user match a user tag, the matches having the highest level of correspondence to the user tags and/or those that are closest in location to the mobile device may be returned. Thus, closest regions having an associated matching tag may be returned with a first priority and closest regions without a matching tag are returned with a secondary priority. The regions may be transmitted to the mobile device in an anonymous manner.

At 610, the mobile application performs region monitoring of the received region(s).

Thus, the regions for region monitoring may be customized to those of highest potential interest to the user by matching user tags and region tags in order to identify the closest regions to be monitored.

The method may further include reporting entrance into and/or exits from one of the monitored regions. Optional aspects are illustrated in FIG. 6 using a dashed line.

At 612, the mobile application may report to the web server entrance of the mobile device into the received region, once the mobile device enters the received region. The web server will then look for any messages associated with entrance into the region that have a tag matching the user tag.

At 614, the mobile application receives from the web server a message associated with the received region, the message having an associated message tag matching the user tag. At 618, the mobile application displays the message to the user.

Although this example is described in connection with entering a region, exiting a region may also trigger the mobile device to report the exit to the web server. Based upon the notification, the web server may return a message to the mobile device, the message having an associated message tag matching the user tag. Other triggers may exist, such as duration (or dwell time) for the amount of time in a region, being a certain radius (near, far, etc) from the region, or by date and time.

In another example, the mobile device may receive assets associated with the region. For example, at 618, the mobile device may receive a user selection of a region.

At 620, the mobile device requests region assets for the user selected region from the web server. This causes the web server to compare the user tags with the asset tags for the region.

At 622, the mobile device receives an asset from the web server, the asset having an associated asset tag matching at least one user tag.

At 624, the mobile device presents the asset to the user. This may include the display of a picture, playing a video, playing audio, etc.

The location information may be transmitted from the mobile device to the web server in an anonymous manner. For example, interaction between the mobile device and the web server may use an anonymous token to identify the mobile device, as described in U.S. Provisional Application No. 62/137,046.

Alternatively, region location information along with distance restrictions, may be transmitted with a region message or digital asset.

For example, when the user downloads an application on the mobile device, the application may register the smart mobile phone with the web service, e.g., in an anonymous manner. The web service returns a GUID to the mobile device application, which is then used as a token for mobile device application and web service interaction. Each application on the mobile device using the web service may have its own GUID. Thus, no personal information for the user or the mobile device is provided to the web server.

At times, the user tag may comprise a predefined keyword. The behavior of an application client at the mobile device may be adjusted based on the predefined keyword. In one example, the predefined keyword may comprise a color, and the application client may be adjusted to display a region using the user-entered color.

The region monitoring at 610, may include periodically requesting an updated list of regions to be monitored. The region monitoring may be performed similar to that described in U.S. Provisional Application No. 62/137,046.

For example, in order to effectively manage the mobile device to monitor the closest N regions, the application may establish a defined region or a "personal region" around the device. The mobile device may receive a personal region size from the web server. The personal region may be adaptively sized based on the distance to the regions returned by the web server.

Periodically, the application on the smart phone device may also check the current location of the device to verify that the device is still within the personal region. If the device has left the personal region, the application may communicate with the web server to establish a new personal region with new regions within it to monitor. Thus, when the mobile device exits the personal region, it may send an indication to the web server and may request an update of the closest regions to be monitored with a preference for regions that match user tags.

In this fashion, a new personal region may only be established when the mobile device exits the previously established personal region. The personal region remains fixed in place and does not move continuously in lock-step with the mobile device movements. Upon exiting its current personal region, a new one may be established.

Thus the mobile device is tuned to adaptively request regions that are nearby to the mobile device and match the user preference tags, and establish a personal region based on the information that is returned by the web server. As the mobile device moves, the personal region may be adaptively resized based on the number of nearby matching regions, but only when it exits its current personal region, thus conserving battery and eliminating the need to track the specific location and movement of the device. This method efficiently manages the number of regions being monitored by the mobile device as well as the need for the mobile application to retrieve more regions as the device moves beyond its personal region.

The location tracking may also include battery saving aspects as described in more detail in connection with U.S. patent application Ser. No. 14/616,400.

Figure 7:
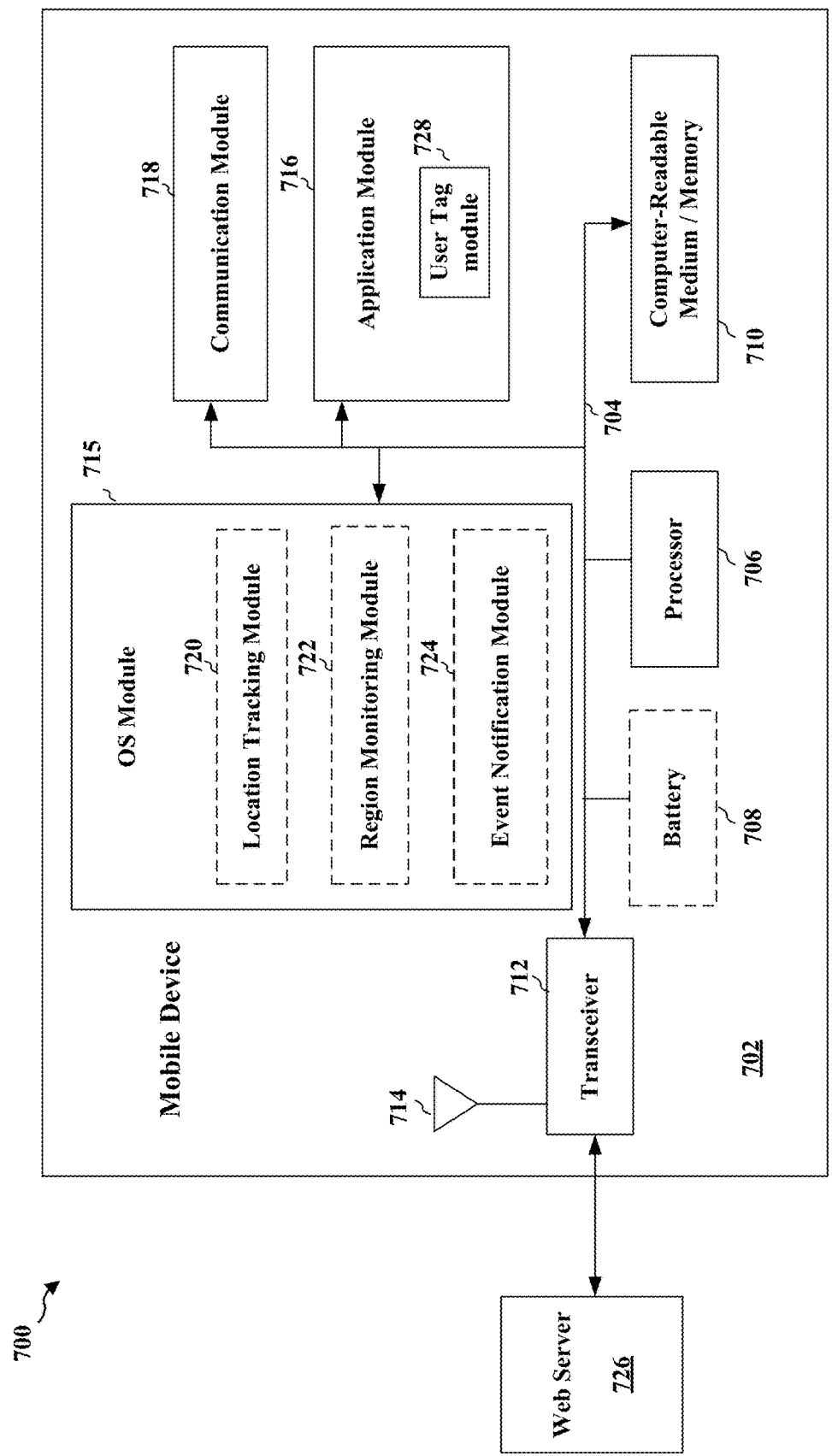
FIG. 7 is a diagram illustrating an example hardware implementation of a mobile device, in accordance with aspects presented herein.

FIG. 7 is a diagram 700 illustrating example aspects of a hardware implementation of a mobile device 702 employing a processing system.

Such a processing system may comprise various circuits including one or more processors and/or modules, represented by the processor 706, the modules 715, 716, 718, 720, 722, 724, and 726, computer-readable medium/memory 710, and battery 708, linked to each other by a bus 704. The bus 702 may link various other circuits which are not described in detail.

The mobile apparatus may comprise a transceiver 712 coupled to the processing system. The transceiver 712 may be coupled to one or more antennas 714 in order to provide a means for communicating with various other apparatus over a transmission medium. For example, the transceiver may be used to transmit the registration, e.g., including user tags, requests for regions to monitor, and location updates including notification of events such as entering/exiting a monitored region, in connection with application 716 and user tag module 728, to a remote web server 726. Such communication may be performed wirelessly, such as using a cellular network and Wi-Fi, among others. The transceiver 712 may be configured to both receive and process signals, e.g., including signals from a web server such as 726, and to provide information from the signal to the processing system, e.g., to communication module. For example, the transceiver may receive communication from the web server 726, such as regions to monitor, and adjusted radius for a personal region, messages, and assets. Communication module 718 may then provide the information to the application module or to another application module.

Processor 706 may be configured for general processing, including the execution of software stored on the computer-readable medium/memory 710. Such software, when executed by the processor 706, may cause the processing system to perform the various functions described supra. The processing system further includes at least one of the modules 715, 716, 718, 720, 722, 724, and 728. For example, the OS 715 of the mobile device may comprise, e.g., a location service module 720 to determine the location of the mobile device, e.g., using any of GPS, Wi-Fi network location mapping module 724, cellular triangulation, in order to determine location updates that can be communicated to application module 716, as described supra. Additionally, OS 715 may include a region monitoring module 722 that performs region monitoring of regions, as instructed by the application(s) downloaded on the mobile device. The OS may further include an event notification module 724 that notifies the application when region enter events, region exit events, and personal region exit events occur. The modules may be software modules running in the processor 706, resident/stored in the computer readable medium/memory 710, one or more hardware modules coupled to the processor 706, or some combination thereof. In one example, mobile device may be a smart phone or other smart device.

Figure 8:
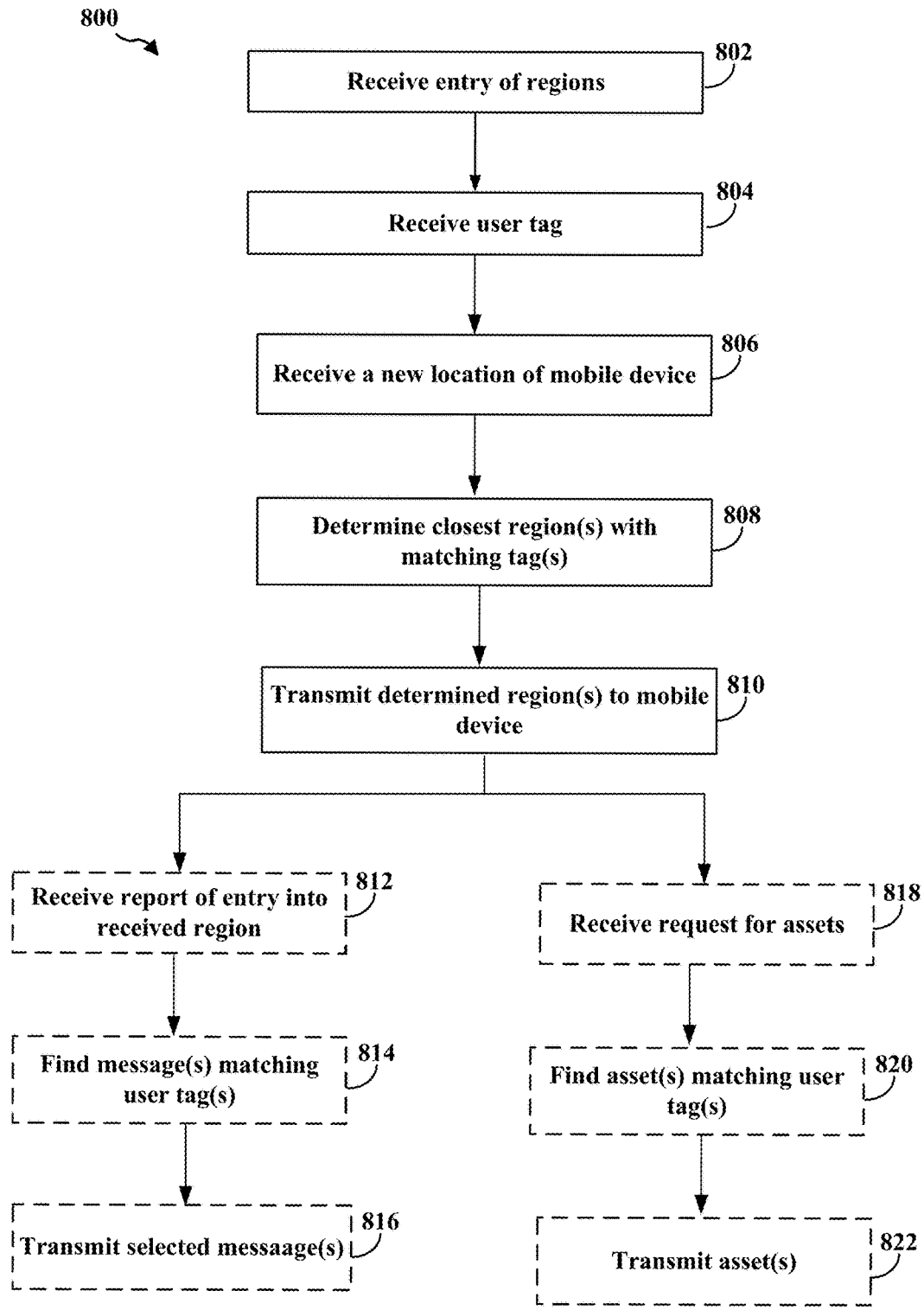
FIG. 8 illustrates a flow chart of an example method, in accordance with aspects of the present disclosure.

FIG. 8 is a method of region monitoring at a web service. This method may be performed by a web server, such as web server 50 in FIG. 5 or web server 726 in FIG. 7.

At 802, the web server receives entry of a plurality of regions each having an associated region tag. For example, different venue operators may access a web browser, such as those illustrated in FIG. 1 in order to create a region and to create associated messages and assets.

At 804, the web server receives a user tag for use in region monitoring from a mobile device.

At 806, the web server receives a new location for the mobile device. For example, the new location may involve a request for updated regions for monitoring. Thus, as the mobile device moves, the web server may adaptively update the list of regions to be monitored.

At 808, based on the received new location and the previously received user tag, the web server determines at least one closest region having a region tag matching the user tag. Although this example is described for only a single tag, the user may enter multiple tags to be used in combination and the regions may also have multiple region tags. Thus, the web server may determine those regions nearby the mobile device that have a closest match to the user tags. The user may also have no user-tags defined, thus the web server may return nearby regions, regardless of their tags.

At 810, the web server transmits the determined region(s) to the mobile device. The mobile device can then use these determined regions for region monitoring.

When the mobile device enters or exits one of the determined regions, the web server may further look to determine whether it should send messages or assets to the mobile device. Optional aspects in FIG. 8 are illustrated using a dashed line.

In one example, the web server may receive an indication that the mobile device has entered the determined region, at 812. The web server then determines whether the region comprises an associated message having a message tag(s) matching the user tag(s) at 814. If the web server identifies such matching messages, it transmits a selected message to the mobile device at 816.

In another example, the web server may receive a request for region assets from the mobile device at 818. The web server then determines whether the region comprises an associated asset having a message tag matching the user tag at 820. At 822, the web server transmits a selected asset to the mobile device when the selected asset for the region has a message tag matching the user tag.

At times, the user tag may comprise a keyword. The keyword may cause the mobile application to adjust its behavior based on the keyword. The web server may continue to match the keywords in the normal manner.

The location and the user tag may be received at the web server from the mobile device in an anonymous manner. For example, the mobile device location and the user tag may be communicated to the web server using an anonymous token to identify the mobile device.

The method may further include generating reports involving the matching of tags for various regions. For example, the method may further include generating a report for a first region regarding the frequency of matches for tags associated with the first region. The report may comprise any of: an identification of region tags associated with the region that are most frequently matched to user tags from mobile devices; an identification of messages tags associated with the region that are most frequently matched to user tags from mobile devices; an identification of asset tags associated with the region that are most frequently matched to user tags from mobile devices; and an identification of region tags associated with the nearby regions that are most frequently matched to user tags from mobile devices.

Figure 9:
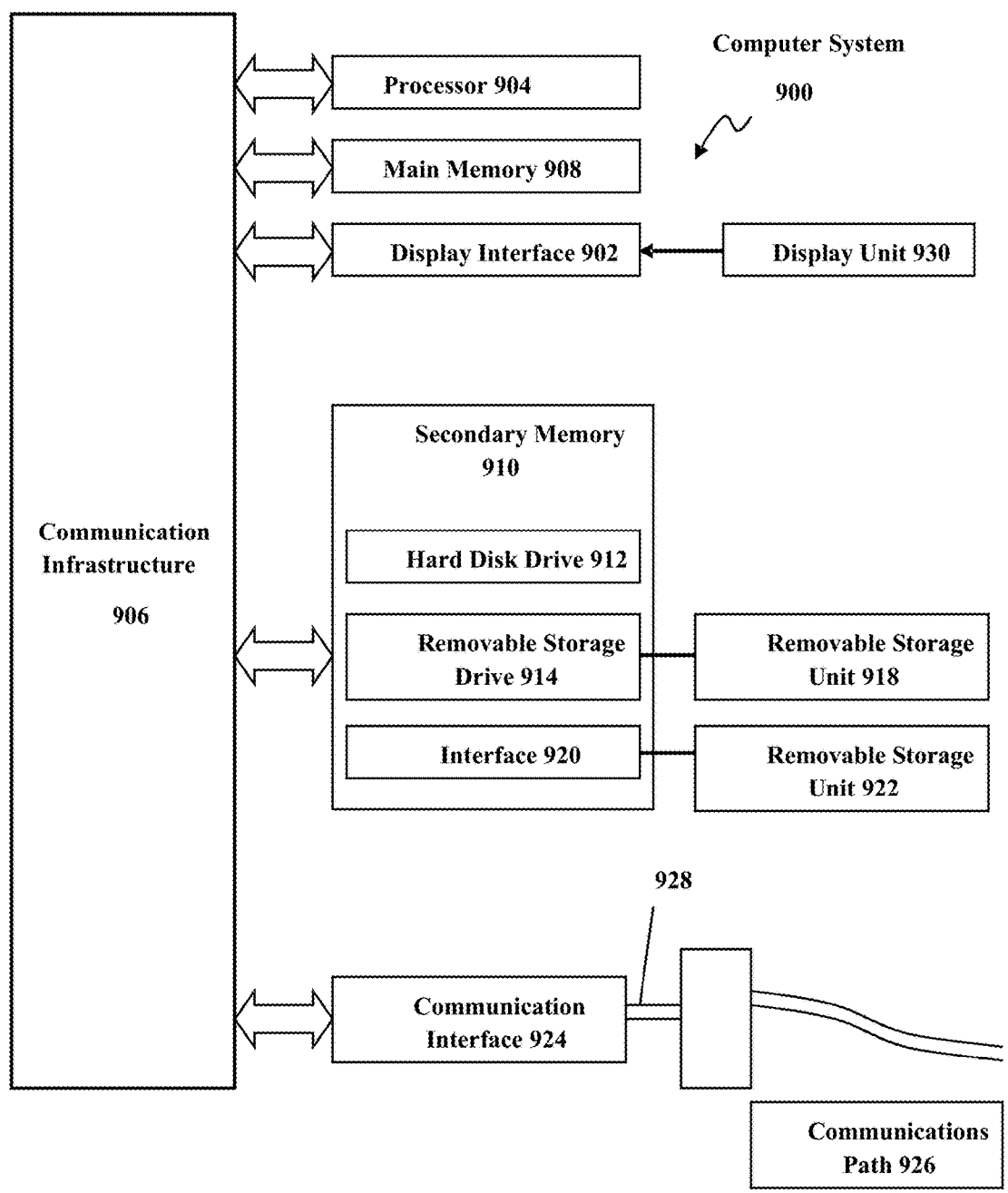
FIG. 9 illustrates a block diagram of various example system components, in accordance with aspects of the present disclosure.

FIG. 9 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein. An example of such a computer system 900 is shown in FIG. 9.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the aspects presented herein using other computer systems and/ or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 912, and signals 928. These computer program products provide software to the computer system 900. Aspects presented herein may include such computer program products.

Computer programs (also referred to as computer control logic) are stored in main memory 908 and/or secondary memory 910. Computer programs may also be received via communications interface 924. Such computer programs, when executed, enable the computer system 900 to perform the features presented herein, as discussed herein. In particular, the computer programs, when executed, enable the processor 910 to perform the features presented herein. Accordingly, such computer programs represent controllers of the computer system 900.

In aspects implemented using software, the software may be stored in a computer program product and loaded into computer system 900 using removable storage drive 914, hard drive 912, or communications interface 920. The control logic (software), when executed by the processor 904, causes the processor 904 to perform the functions as described herein.

In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 10:
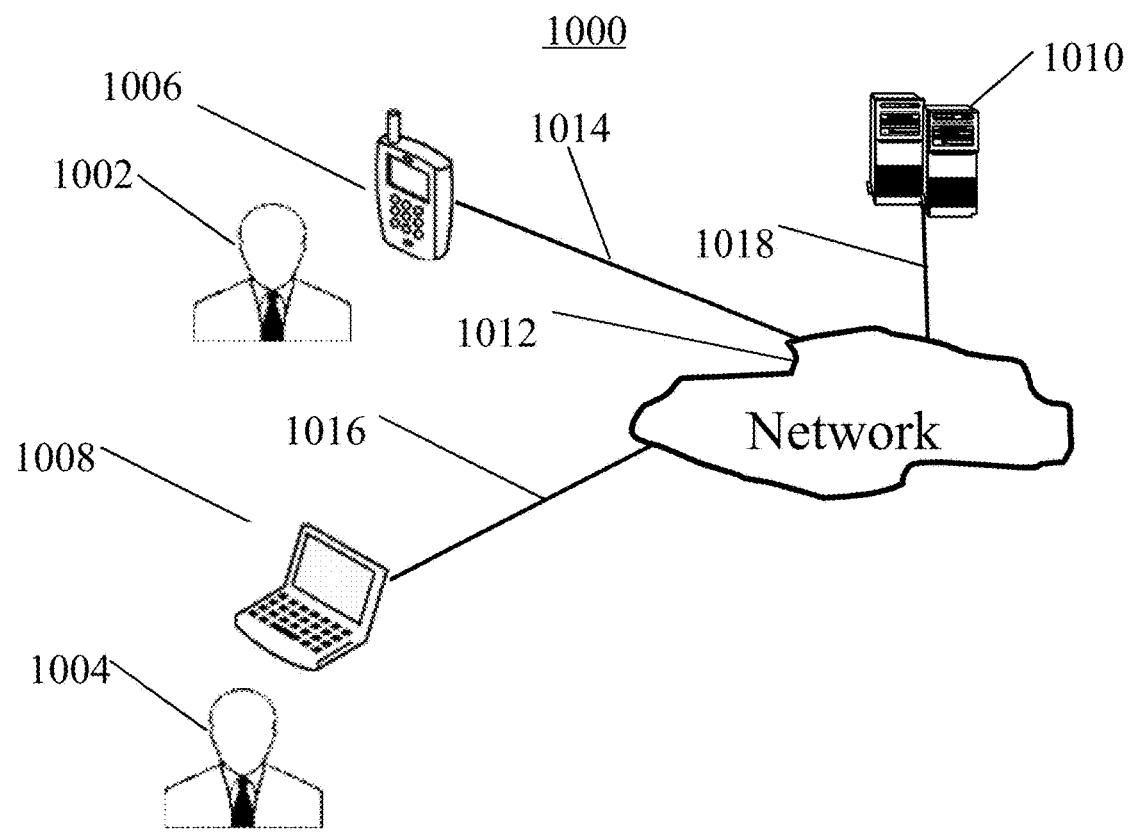
FIG. 10 is a block diagram of various example system components, in accordance with aspects of the present disclosure.

FIG. 10 is a block diagram of various example system components, in an example communication system 1000 usable in accordance with aspects presented herein. The communication system 1000 includes one or more accessors 1002 and 1004 (also referred to interchangeably herein as one or more "users") and one or more terminals 1006, 1008. In one aspect, data for use in accordance aspects presented herein, for example, may be input and/or accessed by accessors 1002, 1004 via terminals 1006, 1008, such as telephonic devices, smart devices, wireless devices, such as personal digital assistants ("PDAs") or a hand-held wireless devices coupled to a server 1010, such as a PC, minicomputer, mainframe computer, microcomputer, or other device having a processor and a repository for data and/or connection to a repository for data, via, for example, a network 1012, such as the Internet or an intranet, and couplings 1014, 1016, and 1018. The couplings 1014, 1016, and 1018 may include, for example, wired, wireless, or fiber optic links. For example, a wireless coupling may comprise a cellular communication link (3G, 4G, LTE or future cellular protocol) or Wi-Fi connection.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of performing region monitoring at a web server, comprising:
    receiving entries corresponding to a plurality of geographic regions, each having an associated region tag;
    receiving a user tag for use in region monitoring by a mobile device;
    receiving a location for the mobile device;
    determining at least one region closest to the location for the mobile device, among the plurality of regions, having a region tag matching the user tag; and
    transmitting the determined region to the mobile device.

2. The method of claim 1, further comprising: receiving an indication that the mobile device has entered the determined region; determining whether the region comprises an associated message having a message tag matching the user tag; and transmitting a selected message to the mobile device when the selected message for the region has a message tag matching the user tag.

3. The method of claim 1, further comprising: receiving a request for region assets from the mobile device; determining whether the region comprises an associated asset having a message tag matching the user tag; and transmitting a selected asset to the mobile device when the selected asset for the region has a message tag matching the user tag.

4. The method of claim 1, wherein the user tag comprises a predefined keyword, the method further comprising: adjusting the behavior of a web service based on the predefined keyword.

5. The method of claim 1, wherein the location and the user tag are received at the web server from the mobile device using an anonymous token to identify the mobile device.

6. The method of claim 1, further comprising: generating a report for a first region regarding the frequency of matches for tags associated with the first region.

7. The method of claim 6, wherein the report comprises at least one of: an identification of region tags associated with the region that are most frequently matched to user tags from mobile devices; an identification of messages tags associated with the region that are most frequently matched to user tags from mobile devices; an identification of asset tags associated with the region that are most frequently matched to user tags from mobile devices; and an identification of region tags associated with the nearby regions that are most frequently matched to user tags from mobile devices.

8. A web service apparatus, comprising:
    a memory; and
    at least one processor coupled to the memory and configured to:
    receive entries corresponding to a plurality of geographic regions, each having an associated region tag;
    receive a user tag for use in region monitoring by a mobile device;
    receive a location for the mobile device;
    determine at least one region closest to the location for the mobile device, among the plurality of regions, having a region tag matching the user tag; and
    transmit the determined region to the mobile device.

9. The apparatus of claim 8, wherein the at least one processor is further configured to: receive an indication that the mobile device has entered the determined region; determine whether the region comprises an associated message having a message tag matching the user tag; and transmit a selected message to the mobile device when the selected message for the region has a message tag matching the user tag.

10. The apparatus of claim 8, wherein the at least one processor is further configured to: receive a request for region assets from the mobile device; determine whether the region comprises an associated asset having a message tag matching the user tag; and transmit a selected asset to the mobile device when the selected asset for the region has a message tag matching the user tag.

11. The apparatus of claim 8, wherein the user tag comprises a predefined keyword and the at least one processor is further configured to: adjust the behavior of a web service based on the predefined keyword.

12. The apparatus of claim 8, wherein the location and the user tag are received at the web server from the mobile device using an anonymous token to identify the mobile device.

13. The apparatus of claim 8, wherein the at least one processor is further configured to: generate a report for a first region regarding the frequency of matches for tags associated with the first region.

14. The apparatus of claim 13, wherein the report comprises at least one of: an identification of region tags associated with the region that are most frequently matched to user tags from mobile devices; an identification of messages tags associated with the region that are most frequently matched to user tags from mobile devices; an identification of asset tags associated with the region that are most frequently matched to user tags from mobile devices; and an identification of region tags associated with the nearby regions that are most frequently matched to user tags from mobile devices.

15. A non-transitory computer-readable medium storing computer executable code, comprising code to:

receive entries corresponding to a plurality of regions, each having an associated region tag;

receive a user tag for use in region monitoring by a mobile device;

receive a location for the mobile device;

determine at least one region closest to the location for the mobile device, among the plurality of regions, having a region tag matching the user tag; and transmit the determined region to the mobile device.

16. The non-transitory computer-readable medium of claim 15, further comprising code to: receive an indication that the mobile device has entered the determined region; determine whether the region comprises an associated message having a message tag matching the user tag; and transmit a selected message to the mobile device when the selected message for the region has a message tag matching the user tag.

17. The non-transitory computer-readable medium of claim 15, further comprising code to: receive a request for region assets from the mobile device; determine whether the region comprises an associated asset having a message tag matching the user tag; and transmit a selected asset to the mobile device when the selected asset for the region has a message tag matching the user tag.

18. The non-transitory computer-readable medium of claim 15, wherein the user tag comprises a predefined keyword and further comprising code to: adjust the behavior of a web service based on the predefined keyword.

19. The non-transitory computer-readable medium of claim 15, wherein the location and the user tag are received at the web server from the mobile device using an anonymous token to identify the mobile device.

* * * * *